(12) United States Patent
Rizk

(10) Patent No.: US 12,721,478 B2
(45) Date of Patent: Sep. 1, 2026

(54) HERB AND SPICE GRINDER APPARATUS

(71) Applicant: Thomas Rizk, Myrtle Beach, SC (US)

(72) Inventor: Thomas Rizk, Myrtle Beach, SC (US)

( * ) Notice: Subject to any disclaimer, the term of this patent is extended or adjusted under 35 U.S.C. 154(b) by 274 days.

(21) Appl. No.: 18/669,929

(22) Filed: May 21, 2024

(65) Prior Publication Data

US 2024/0389796 A1 Nov. 28, 2024

Related U.S. Application Data

(60) Provisional application No. 63/468,311, filed on May 23, 2023.

(51) Int. Cl.

*A47J 42/14* (2006.01)
*A47J 42/20* (2006.01)
*A47J 42/24* (2006.01)
*A47J 42/40* (2006.01)

(52) U.S. Cl.

CPC .............. *A47J 42/14* (2013.01); *A47J 42/20* (2013.01); *A47J 42/40* (2013.01)

(58) Field of Classification Search

CPC .. A47J 42/14; A47J 42/20; A47J 42/40; A47J 42/24; A47J 42/34

See application file for complete search history.

(56) References Cited

U.S. PATENT DOCUMENTS

| | | | | |
|---|---|---|---|---|
| 9,198,541 | B2 * | 12/2015 | Smith | A47J 43/25 |
| 9,241,597 | B2 | 1/2016 | Dukat | |
| 10,039,418 | B2 * | 8/2018 | Staiano | A47J 42/00 |
| 10,562,033 | B2 * | 2/2020 | McDonough Migale | A47J 42/24 |
| 11,207,695 | B2 | 12/2021 | Breneman | |
| 11,497,352 | B1 | 11/2022 | Acar | |
| 2017/0164786 | A1 * | 6/2017 | Camitta | A24B 7/06 |
| 2020/0113386 | A1 * | 4/2020 | Nagrani | A47J 42/50 |
| 2022/0161270 | A1 * | 5/2022 | Huang | A24C 5/40 |
| 2022/0183342 | A1 * | 6/2022 | He | A47J 42/14 |
| 2023/0027095 | A1 | 1/2023 | Ashton | |

* cited by examiner

*Primary Examiner* — Mohammed S. Alawadi
(74) *Attorney, Agent, or Firm* — P. Jeff Martin; The Law Firm of P. Jeffrey Martin, LLC

(57) ABSTRACT

An improved herb and spice grinder includes a top section with teeth, a grinding section with teeth, an annular spacer, and a base section, the annular spacer includes an upwardly-depending dividing wall and a plurality of doors hingedly coupled superjacent the dividing wall so as to enable each herb and/or spice to be separated prior to grinding. The herbs and/or spices are loaded into the grinding section. The top section is rotatably attached to the grinding section, and the annular section is rotatably attached between the grinding section and the base section in a stacked fashion.

2 Claims, 3 Drawing Sheets

HERB AND SPICE GRINDER APPARATUS

I. RELATED APPLICATIONS

The present application claims priority to U.S. Provisional Patent Application No. 63/468,311, filed on May 23, 2023, the disclosure of which is hereby incorporated by reference in its entirety.

II. FIELD OF THE INVENTION

The present application discloses and describes and describes a grinder apparatus, and more particularly a grinder apparatus having multiple sections for achieving various actions and/or activities.

III. BACKGROUND OF THE INVENTION

A number of apparatuses and devices have been developed and introduced in an attempt to provide an improved grinder apparatus for material such as herb(s) and/or spices (s). Among the many attempts, although not an exhaustive list of such activities, the following provide a comprehensive overview of the materials grinding industry and the apparatuses relevant thereto.

U.S. Pat. No. 9,241,597 B2, issued in the name of Dukat, discloses an herb grinder that includes four tiers for cutting and collecting dried herbs, arced cutters, a tier for collecting the cut herbs, and an additional tier for separating the cut herbs from the ultra-fine pollen particles, and further discloses a cross bar 330 disposed horizontally in the third tier 300 (see Col. 3, lines 15-17).

U.S. Patent Publication No. 2023/0027095 A1, published in the name of Ashton, discloses an herb grinder which includes a first cutting element having a first annular body projecting from a base disk having an annular rim, and cutting blades extending from a floor in a first areal region separate from a second areal region having no cutting blades, and a second cutting element having a second annular body with a planar top having a through opening and cutting blades extending from an inside surface of the top, the second cutting element engaging the first cutting element at a specific position wherein the opening through the top lies directly over the second areal region of the floor of the first cutting element having no cutting blades.

U.S. Pat. No. 11,497,352 B1, issued in the name of Acar, discloses a three-piece herb grinder that includes a top portion, a base portion and a mid-portion that sits therebetween. The top portion includes an enclosed lid with a bottom portion with a cavity formed therein containing a plurality of teeth extending downwardly therefrom. The top portion has two or more magnets placed around the perimeter of the bottom portion. The mid-portion attaches to the top portion through two more corresponding magnets on the top of the mid-portion, and further discloses an optional basket 16 can be divided into sections 54A, 54B (see Col. 3, lines 24-25, and FIGS. 2 and 5).

U.S. Pat. No. 9,198,541 B2, issued in the name of Smith, discloses an herb grinder having a top portion and upper chamber wherein herbs and similar materials may be ground, with the grinder having a spout, allowing ground herbs and materials to exit the grinder without separating the parts of the grinder.

U.S. Pat. No. 10,039,418 B2, issued in the name of Staiano et al., discloses a system and method for grinding herbs, tobacco, marijuana and the like, wherein system herein includes interchangeable and replaceable lower grinder plates that are secured in place with threading, bayonet mounts or the like, having upper and lower grinding plates and with blades having a modified diamond shape which provides extremely sharp leading edges regardless of which direction the grip assembly of the grinder housing is rotated, and with lower plates provided with variations in the size, shape and arrangement of hole sizes through which the ground material is allowed to pass through.

U.S. Pat. No. 11,207,695 B2, issued in the name of Breneman, discloses a grinder with a bottom and with a first row of first asymmetrical blades extending from the bottom, and a top of the grinder has a second row of second asymmetrical blades extending from the top, wherein the first asymmetrical blades and second asymmetrical blades are triangle shaped, wherein the first side of each blade has one point, and a second side of each blade has two points.

Accordingly, a need continues to exist and is recognized for an apparatus, system, and/or method that provides an improved grinding apparatus.

This application presents claims and embodiments that fulfill a need or needs not yet satisfied by the products, inventions, systems, methods and previously or presently available. In particular, the claims and embodiments disclosed herein describe an herb and spice grinder apparatus, the apparatus comprises a top section comprising a comprising a plurality of downwardly extending teeth; a grinding section comprising a floor from which a plurality of grinding posts upwardly extend, and the floor comprising a plurality of holes, the top section mutually coupled to the grinding section; an annular spacer comprising an upstanding wall extending integrally diametrically across an interior circumferential sidewall thereof, the annular spacer comprising a plurality of doors hingedly coupled to the internal circumferential sidewall of annular spacer superjacent the upstanding wall; and a base section providing a ground material storage and collection compartment, the base section mutually coupled to the annular section, the herb and spice grinder apparatus providing unanticipated and nonobvious combination of features distinguished from the products, devices, apparatuses, inventions, systems, and methods preexisting in the art. The applicant is unaware of any device, apparatus, method, system disclosure or reference that discloses the features of the claims and embodiments disclosed herein.

IV. SUMMARY OF THE INVENTION

Generally, according to a broadly described embodiment, a grinder apparatus for grinding herb(s) and/or spice(s) is disclosed. The grinder apparatus comprises a top section, a grinding section, an annular spacer, and a base section, wherein the top section and grinding section are mutually coupled, the grinding section and annular spacer are mutually coupled, and the annular spacer and base section are mutually coupled in a stacked orientation.

The top section includes a plurality of teeth depending downwardly from the underside thereof.

The grinding section includes a floor and an open top forming a well. The grinding section further includes a plurality of teeth upwardly depending from the floor and a plurality of holes defined through the floor.

The annular spacer comprises a disc-shaped form having an opening through the length of the spacer through which the ground material will pass and into the base section. An upstanding wall extends integrally diametrically across the interior circumferential sidewall of annular spacer so as to divide the interior void of spacer into two halves forming a first opening and a second opening providing access to the base section within which ground herb and/or spice material is introduced, stored, and collected.

A plurality of doors is hingedly coupled superjacent the upstanding wall to the internal circumferential sidewall of annular spacer.

The base section comprises a disc-shaped form with an opening in the top and a floor. The floor retains any material ground by the grinding section. The base section is threadedly mateable with the annular spacer. Accordingly, the base section may also be threadably unmated from the annular spacer to provide access to the ground material(s).

In accordance to another embodiment, a sieve is insertable between the annular spacer and the base section, wherein the sieve provides a finer or refined product collected in the base section.

In accordance to still another embodiment, a kit is envisioned, wherein the kit includes the grinder apparatus, and at least one implement. The at least one implement may include a brush, a scraper, and/or a scissor scooper.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

VI. DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
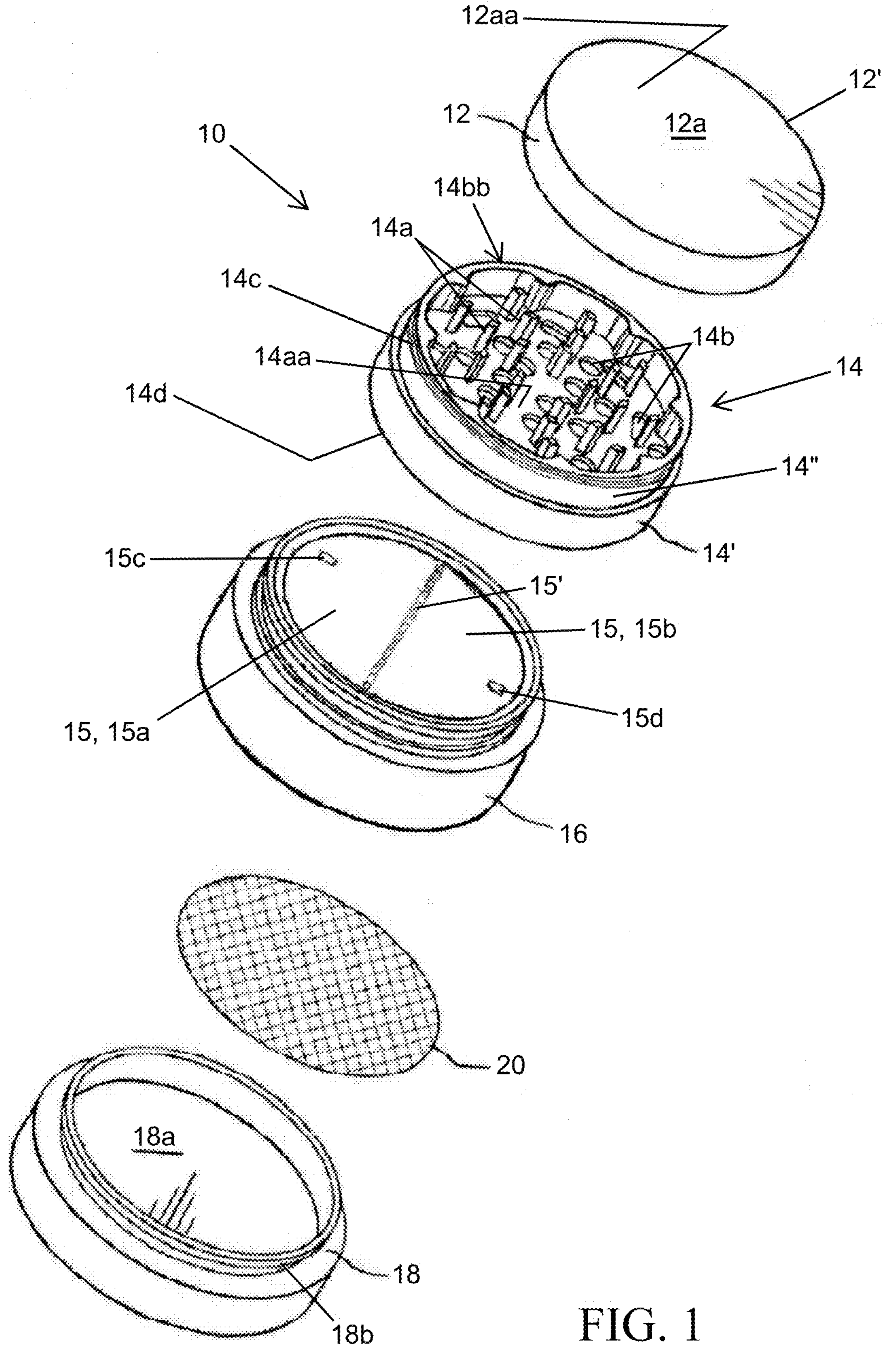
FIG. 1 is an exploded perspective view of an herb and/or spice grinder apparatus having a plurality of parts, including a top section, a grinding section, an annular spacer, and a base section, and which may include a sieve therein.
Figure 2:
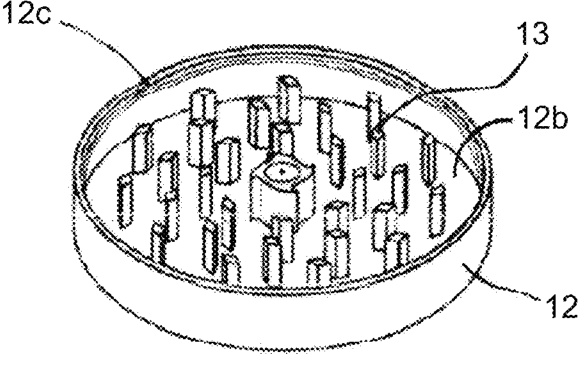
FIG. 2 is a bottom perspective view of the top section in FIG. 1.
Figure 3:
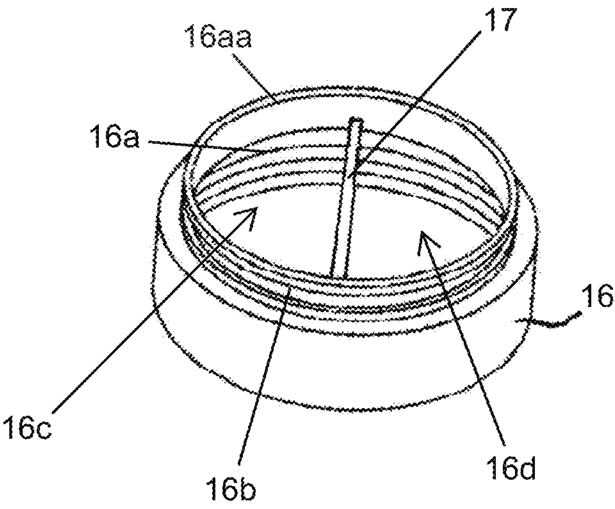
FIG. 3 is a top perspective view of the annular spacer shown with the plurality of doors removed depicting the upstanding wall, in accordance to one embodiment of the present invention.

According to at least one embodiment, and consistent with FIGS. 1-2, a grinder apparatus for grinding herb(s) and/or spice(s) is depicted and described, the grinder apparatus generally denoted by reference character 10. The grinder apparatus 10 comprises a top section 12, a grinding section 14, an annular spacer 16, and a base section 18, wherein the top section 12 and grinding section 14 are mutually coupled, the grinding section 14 and annular spacer 16 are mutually coupled, and the annular spacer 16 and base section 18 are mutually coupled. In another embodiment, apparatus 10 also includes a sieve 20 insertable between the annular spacer 16 and the base section 18, the sieve 20 providing a finer or refined product collected in the base section 18.

The top section 12 comprises a disc-shaped form comprising a top portion 12' having an upper surface **12*a* opposing a lower surface 12*b*. The top portion 12' has an outer periphery from which a sidewall integrally extends downwardly. A plurality of teeth 13 extend integrally downward from the lower surface 12*b* of the top portion 12' (as best illustrated in FIG. 2). The top section 12 also includes a plurality of internal threads 12*c*** formed on the inner surface of the sidewall.

In accordance to one embodiment, the top section 12 is constructed of a marking material enabling indicia to be written on the upper surface **12*a*** thereof and erased therefrom, so as to provide a reusable marking surface.

In accordance to another embodiment, the upper surface **12*a* of the top portion 12' of the top section 12** is disposed with a marking membrane or overlay adapted and configured to enable indicia to be written thereon and erased therefrom, so as to provide a reusable marking surface. Exemplary indicia may include, but is not limited to, "S" representing Salt, "P" representing Pepper, and "C" representing Cinnamon.

The grinding section 14 comprises a disc-shaped form comprising a circular base 14' from which a circular drum 14" extends integrally upward therefrom and recessed from the perimeter of circular base 14'. The circular drum 14" comprises a floor **14*aa* and an open top 14*bb*. A plurality of grinding posts 14*a* or teeth extend integrally upward from the floor 14*aa*, and a plurality of apertures or holes 14*b* are defined through the floor 14*aa*. The floor 14*aa* and the open top 14*bb* forming a well or recess that supports the grinding posts 14*a* and holes 14*b* used for grinding the herb and/or spice material(s) and moving the ground material into and through the annular section 16. The plurality of apertures or holes 14*b*** may be provided in various shapes and sizes, such as including, but not limited to circular, oval, triangular, rectangular, and a combination of shapes and sizes.

The grinding section 14 includes a plurality of external threads **14*c* formed on the external circumferential surface of the circular drum 14" being threadedly mateable with the top section 12 also includes a plurality of internal threads 12*c* of the top section 12. The grinding section 14 further includes a plurality of internal threads 14*d* formed on the inside of the circular base 14' that are threadably mateable with external threads 16*b* of the annular spacer 16**.

Rotation of the top section 12 enables the plurality of teeth **13*a* depending from the lower surface 12*b* thereof to translate between the posts/teeth 14*a* of the grinding section 14, causing the herb(s) and/or spice(s) material(s) placed therein to be ground as desired. The top section 12 also includes a plurality of internal threads 12*c* formed on the inner surface of the sidewall that are threadably mateable with the external threads 14***c* of the grinding section 14. Threadedly engaging the top section 12 with the grinding section 14 in a repeated clockwise and counter-clockwise manner enables the teeth 13*a* and 14*a* of the top section 12 and grinding section 14, respectively, to grind the herb(s) and/or spice(s) material(s) resting within the well of the grinding section 14.

The annular spacer 16 comprises a disc-shaped form having an opening through the length of the spacer 16 through which the ground material will pass and into the base section 18. The annular spacer 16 provides additional length to the apparatus 10. The additional length permits additional herb and/or spice material to be introduced and stored within the apparatus 10 (in the base section 18). The annular spacer 16 includes a plurality of external threads 16*b* threadedly mateable with the plurality of internal threads 14*d* of the grinding section 14. The annular spacer 16 further includes a plurality of internal threads 16*a* that are threadably mateable with the external threads 18*b* of the base section 18. An upstanding wall 17 extends integrally diametrically across the interior circumferential sidewall of annular spacer 16 so as to divide the interior void of spacer 16 into two halves forming a first opening 16*c* and a second opening 16*d* providing access to the base section 18, wherein base section 18 is positioned subjacent the annular spacer 16. The upstanding wall 17 is positioned so as to be recessed below the upper lip 16*aa* or continuous top edge of annular spacer 16.

A plurality of doors 15 is hingedly coupled via a hinge 15' to the internal circumferential sidewall of annular spacer 16 superjacent the upstanding wall 17. The plurality of doors 15 extends diametrically across the interior circumferential sidewall of annular spacer 16. In accordance to one embodiment, the plurality of doors 15 comprises a first door 15*a* and a second door 15*b*. In a resting position, the plurality of doors 15 lies planar so as to be oriented slightly recessed below the upper lip 16*aa* or continuous top edge of the annular spacer 16, as best shown in FIG. 1. Each of the doors 15*a* and 15*b* includes a handle 15*c* and 15*d*, respectively, so as to facilitate quick, easy, and efficient opening and closing of the doors 15*a* and 15*b*. The first door 15*a* and the second door 15*b* are configured so as to hingedly open via hinge 15' along an angle measuring approximately 180°. The handles 15*c* and 15*d* of doors 15*a* and 15*b*, respectively, are positioned so as to be staggered so as to prevent engagement with one another when a selected door 15*a* or 15*b* is opened approximately 180°. The opening of a single door 15*a* or 15*b* during a grinding event allows the user to select one or more herbs and/or spices at a time for grinding. Once the selected grinding material has been ground and is resting in the base section 18, the user opens a single door 15*a* or 15, inserts a previously non-selected one or more herbs and/or spices into the well of grinding section 14, and grinds the material. The ground material drops through the holes 14*b* in the floor 14*aa* of the drum 14", through the circular base 14' (grinding section 14) and collects in the base section 18 joining the first or previously selected one or more herbs and/or spices.

The base section 18 comprises a disc-shaped form with an opening in the top of the base section 18 and a floor 18*a* formed in the bottom of the base section 18. The floor 18*a* retains any material ground by the grinding section 14. As previously described, the base section 18 includes external threads 18*b* threadedly mateable with the plurality of internal threads 16*a* of annular spacer 16. Accordingly, the base section 18 may also be threadably unmated from the annular spacer 16 to provide access to the ground material(s).

Figure 4:
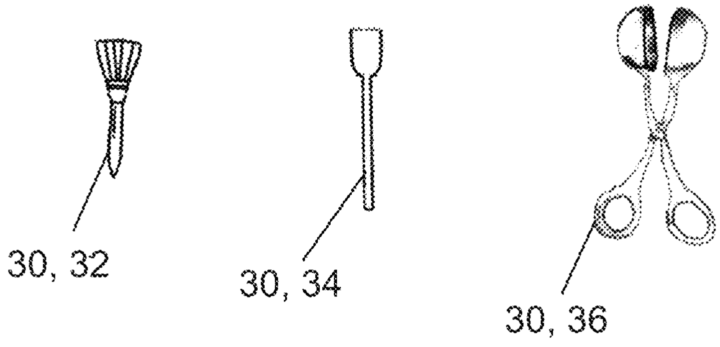
FIG. 4 illustrates various implements which may be provided in a kit.
Figure 4A:
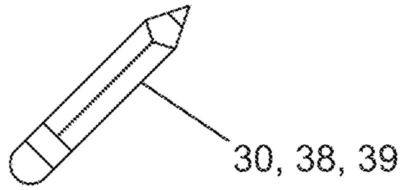
FIG. 4A illustrates another implement which may be provided in a kit.

Referring now more particularly to FIGS. 1, 4, and 4A, it is envisioned that a kit may be made commercially available, wherein the kit comprising the grinder apparatus 10, consistent with FIG. 1, and further including at least one implement 30 in the form of a brush 32, scraper 34, and/or scissor scooper 36. The brush 32, scraper 34, and scissor scooper 36 may be used to respectively sweep, scrape, or scoop ground herb and/or spice material(s) sitting atop the lower side of an opened door 15*a*, 15*b* after a grinding event. The implement 30 may also be used to collect and/or clean the finer material away from the holes 14*b* in the grinding section 14.

The kit may further comprise another implement 30 in the form of a writing instrument 38, such as a pencil 39 or pen, to allow a user to write desired indicia on the upper surface 12*a* of the top section 12, or on the marking overlay 12*aa* disposed on the upper surface 12*a* of the top portion 12' of the top section 12.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An herb and spice grinder apparatus comprising:

a top section comprising a plurality of teeth extending integrally downward from a lower surface of the top section, the top section comprising a plurality of internal threads;

a grinding section comprising a floor and an open top, a plurality of grinding posts extending integrally upward from the floor, and a plurality of holes defined through the floor, the grinding section comprises a plurality of external threads, wherein the plurality of external threads mutually coupled with the plurality of internal threads of the top section, and the grinding section comprising a plurality of internal threads;

an annular spacer comprising a plurality of external threads mutually coupled with the plurality of internal threads of the grinding section, the annular spacer comprising an upstanding wall extending integrally diametrically across an interior circumferential sidewall of the annular spacer, the annular spacer comprising a plurality of internal threads, and the annular spacer comprising a plurality of doors hingedly coupled via a hinge to the interior circumferential sidewall of annular spacer superjacent the upstanding wall; and a base section comprising an opening and a floor opposite the opening, the floor of the base section forming a base enclosure for capturing materials ground by the top section and the grinding section, the base section comprising a plurality of external threads mutually coupled with the plurality of internal threads of the annular section.

2. An herb and spice grinder apparatus comprising:

a top section comprising a plurality of teeth extending integrally downward from a lower surface of the top section, the top section comprising a plurality of internal threads;

a grinding section comprising a floor and an open top, a plurality of grinding posts extending integrally upward from the floor, and a plurality of holes defined through the floor, the grinding section comprises a plurality of external threads, wherein the plurality of external threads mutually coupled with the plurality of internal threads of the top section, and the grinding section comprising a plurality of internal threads;

an annular spacer comprising a plurality of external threads mutually coupled with the plurality of internal threads of the grinding section, the annular spacer comprising an upstanding wall extending integrally diametrically across an interior circumferential sidewall of the annular spacer, the annular spacer comprising a plurality of internal threads, and the annular spacer comprising a plurality of doors hingedly coupled via a hinge to the interior circumferential sidewall of annular spacer superjacent the upstanding wall;

a base section comprising an opening and a floor opposite the opening, the floor of the base section forming a base enclosure for capturing materials ground by the top section and the grinding section, the base section comprising a plurality of external threads mutually coupled with the plurality of internal threads of the annular section; and a sieve inserted between the annular section and the base section, the sieve for filtering the materials ground by the top section and the grinding section.

* * * * *